(12) United States Patent
Kataoka

(10) Patent No.: US 11,977,943 B2
(45) Date of Patent: May 7, 2024

(54) NONCONTACT COMMUNICATION MEDIUM INCLUDING AN ANTENNA COIL THAT IS FORMED ON A SUBSTRATE HAVING A THROUGH-HOLE

(71) Applicant: FUJIFILM CORPORATION, Tokyo (JP)

(72) Inventor: Eiichiro Kataoka, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 249 days.

(21) Appl. No.: 17/553,809

(22) Filed: Dec. 17, 2021

(65) Prior Publication Data
US 2022/0198240 A1 Jun. 23, 2022

(30) Foreign Application Priority Data
Dec. 22, 2020 (JP) ................................. 2020-212860

(51) Int. Cl.
*G08B 21/00* (2006.01)
*G06K 19/077* (2006.01)

(52) U.S. Cl.
CPC . *G06K 19/07781* (2013.01); *G06K 19/07775* (2013.01); *G06K 19/07794* (2013.01)

(58) Field of Classification Search
CPC ....... G06K 19/07781; G06K 19/07775; G06K 19/07794; G06K 19/0708; G06K 19/07783; G06K 19/07784; G06K 19/07779; G06K 19/07718
See application file for complete search history.

(56) References Cited

U.S. PATENT DOCUMENTS

| | | | |
|---|---|---|---|
| 6,666,380 B1 | 12/2003 | Suzuya | |
| 2004/0144847 A1* | 7/2004 | Yamanaka | G06K 19/07783 235/492 |
| 2011/0024510 A1* | 2/2011 | Kato | G06K 19/07784 235/492 |
| 2015/0154491 A1* | 6/2015 | Charrat | G06K 19/07745 29/601 |
| 2017/0271757 A1* | 9/2017 | Kato | H01Q 5/48 |
| 2019/0236432 A1* | 8/2019 | Orihara | H01Q 1/24 |

FOREIGN PATENT DOCUMENTS

| | | |
|---|---|---|
| JP | 2001-084343 A | 3/2001 |
| JP | 2009-080843 A | 4/2009 |
| JP | 2015-114754 A | 6/2015 |

* cited by examiner

*Primary Examiner* — Mark S Rushing
(74) *Attorney, Agent, or Firm* — SOLARIS Intellectual Property Group, PLLC

(57) ABSTRACT

A noncontact communication medium includes an antenna coil that is formed on a substrate having a through-hole and induces power with application of a magnetic field from an outside, and a processing circuit that operates using the power induced by the antenna coil. The processing circuit is inserted in the middle of the antenna coil. The antenna coil is wound in a loop shape along an outer periphery of the substrate. An outer peripheral end of the antenna coil is connected to the through-hole. A portion of the antenna coil on the substrate facing a position of the through-hole has a shape recessed to an inner peripheral side of the antenna coil in a winding direction.

12 Claims, 13 Drawing Sheets

NONCONTACT COMMUNICATION MEDIUM INCLUDING AN ANTENNA COIL THAT IS FORMED ON A SUBSTRATE HAVING A THROUGH-HOLE

CROSS-REFERENCE TO RELATED APPLICATIONS

This application claims priority under 35 USC 119 from Japanese Patent Application No. 2020-212860 filed on Dec. 22, 2020, the disclosure of which is incorporated by reference herein.

BACKGROUND

1. Technical Field

A technique of the present disclosure relates to a noncontact communication medium.

2. Related Art

JP2015-114754A discloses an IC card comprising at least an IC chip, a connection terminal substrate, and a circuit pattern. The IC chip has both a contact communication function and a noncontact communication function. The connection terminal substrate includes an external connection terminal having a plurality of compartments and an RF connection terminal. The circuit pattern includes an antenna coil and an antenna coil connection terminal. The RF connection terminal and the antenna coil connection terminal are connected through a bonding material at least containing a conductive substance. In the IC card described in JP2015-114754A, the connection terminal substrate has holes in a connection terminal base material in the compartments not used for contact communication, and the external connection terminal and an antenna connection terminal are connected by metal.

JP2001-084343A discloses a noncontact IC card comprising a quadrangular insulating substrate, an IC chip mounted on a main surface of the insulating substrate, and an antenna coil formed in a peripheral portion of the main surface of the insulating substrate. In the noncontact IC card described in JP2001-084343A, the antenna coil has an antenna section and a mounting terminal section of the IC chip formed and disposed below the IC chip. The mounting terminal section of the IC chip is substantially formed thinner than the antenna section.

JP2009-080843A discloses a semiconductor device that is mounted on a card body comprising an antenna coil for performing wireless communication with an external transmission and reception device. The semiconductor device has a wiring board, a first connection terminal, a second connection terminal, a semiconductor chip, a third connection terminal, a fourth connection terminal, and a capacitor. The wiring board has a main surface and a back surface on an opposite side to the main surface. The first connection terminal is provided on the main surface of the wiring board and is electrically connected to one end of the antenna coil through a first conductive material. The second connection terminal is provided on the main surface of the wiring board and is electrically connected to the other end of the antenna coil through the first conductive material. The semiconductor chip is mounted on the main surface of the wiring board, is electrically connected to the first connection terminal and the second connection terminal, and performs data processing. The third connection terminal is provided on the main surface of the wiring board and is electrically connected to the first connection terminal by wiring of the wiring board. The fourth connection terminal is provided on the main surface of the wiring board and is electrically connected to the second connection terminal by wiring. The capacitor has one end electrically connected to the third connection terminal and the other end electrically connected to the fourth connection terminal by a second conductive material to form a resonance circuit. In the semiconductor device described in JP2009-080843A, the first connection terminal and the second connection terminal are disposed on different sides of the semiconductor chip.

SUMMARY

An embodiment according to the technique of the present disclosure provides a noncontact communication medium capable of widening a region on an inner peripheral side of an antenna coil compared to a case where a portion of an antenna coil on a substrate facing a position of a through-hole has a shape not recessed to an inner peripheral side of the antenna coil.

A first aspect according to the technique of the present disclosure a noncontact communication medium comprising an antenna coil that is formed on a substrate having a through-hole and induces power with application of a magnetic field from an outside, and a processing circuit that operates using the power induced by the antenna coil, in which the processing circuit is inserted in the middle of the antenna coil, the antenna coil is wound in a loop shape along an outer periphery of the substrate, an outer peripheral end of the antenna coil is connected to the through-hole, and a portion of the antenna coil on the substrate facing a position of the through-hole has a shape recessed to an inner peripheral side of the antenna coil in a winding direction.

A second aspect according to the technique of the present disclosure is the noncontact communication medium according to the first aspect, in which the portion of the antenna coil facing the position of the through-hole has a shape bent in a V shape to the inner peripheral side in the winding direction.

A third aspect according to the technique of the present disclosure is the noncontact communication medium according to the first aspect, in which the portion of the antenna coil facing the position of the through-hole has a shape bent in a U shape to the inner peripheral side in the winding direction.

A fourth aspect according to the technique of the present disclosure is the noncontact communication medium according to the first aspect, in which the portion of the antenna coil facing the position of the through-hole has a shape bent in an arc shape to the inner peripheral side in the winding direction.

A fifth aspect according to the technique of the present disclosure is the noncontact communication medium according to any one of the first aspect to the fourth aspect, in which the substrate has a plurality of surfaces in a thickness direction, the antenna coil is formed on a first surface among the plurality of surfaces, and one end and the other end of the antenna coil are electrically connected through an auxiliary antenna coil on a second surface different from the first surface among the plurality of surfaces.

A sixth aspect according to the technique of the present disclosure is the noncontact communication medium according to the fifth aspect, in which the first surface is one surface of a front surface and a back surface of the substrate, and the second surface is the other surface of the front surface and the back surface.

A seventh aspect according to the technique of the present disclosure is the noncontact communication medium according to the fifth aspect or the sixth aspect, in which the one end and the other end are electrically connected on the second surface through the through-hole.

An eighth aspect according to the technique of the present disclosure is the noncontact communication medium according to any one of the fifth aspect to the seventh aspect, in which the auxiliary antenna coil is formed on the second surface and is wound in a loop shape along the outer periphery of the substrate.

A ninth aspect according to the technique of the present disclosure is the noncontact communication medium according to the eighth aspect, in which an outer peripheral end of the auxiliary antenna coil is connected to the through-hole, and a portion of the auxiliary antenna coil on the second surface facing the position of the through-hole has a shape recessed to an inner peripheral side of the auxiliary antenna coil in a winding direction.

A tenth aspect according to the technique of the present disclosure is the noncontact communication medium according to the eighth aspect or the ninth aspect, in which the antenna coil formed on the first surface and the auxiliary antenna coil formed on the second surface are disposed in a zigzag pattern in the thickness direction of the substrate.

An eleventh aspect according to the technique of the present disclosure is the noncontact communication medium according to any one of the first aspect to the tenth aspect, in which the processing circuit is disposed on the inner peripheral side of the antenna coil in the winding direction.

BRIEF DESCRIPTION OF THE DRAWINGS

Exemplary embodiments of the present invention will be described in detail based on the following figures, wherein.

DETAILED DESCRIPTION

Figure 1:
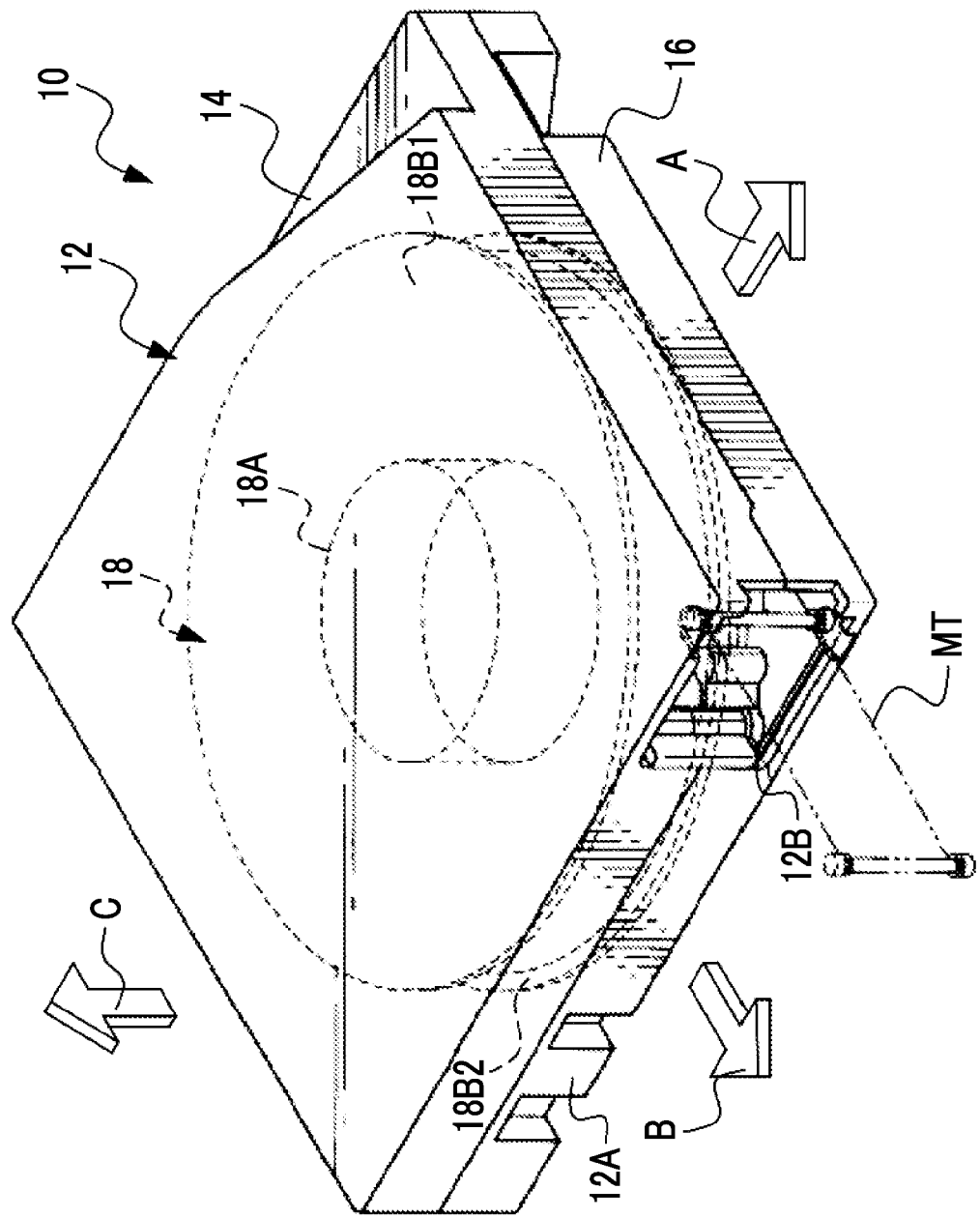
FIG. 1 is a schematic perspective view showing an example of the appearance of a magnetic tape cartridge according to an embodiment.

First, terms that are used in the following description will be described.

CPU is an abbreviation for "Central Processing Unit". RAM is an abbreviation for "Random Access Memory". NVM is an abbreviation for "Non-Volatile Memory". ROM is an abbreviation for "Read Only Memory". EEPROM is an abbreviation for "Electrically Erasable and Programmable Read Only Memory". SSD is an abbreviation for "Solid State Drive". USB is an abbreviation for "Universal Serial Bus". ASIC is an abbreviation for "Application Specific Integrated Circuit". PLD is an abbreviation for "Programmable Logic Device". FPGA is an abbreviation for "Field-Programmable Gate Array". SoC is an abbreviation for "System-on-a-Chip". IC is an abbreviation for "Integrated Circuit". RFID is an abbreviation for "Radio Frequency IDentifier". LTO is an abbreviation for "Linear Tape-Open".

In the following description, for convenience of description, in FIG. 1, a loading direction of a magnetic tape cartridge 10 on a magnetic tape drive 30 (see FIG. 4) is indicated by an arrow A, a direction of the arrow A is referred to a front direction of the magnetic tape cartridge 10, and a side in the front direction of the magnetic tape cartridge 10 is referred to as a front side of the magnetic tape cartridge 10. In the following description on the structure, "front" indicates the front side of the magnetic tape cartridge 10.

In the following description, for convenience of description, in FIG. 1, a direction of an arrow B perpendicular to the direction of the arrow A is referred to as a right direction, and a side in the right direction of the magnetic tape cartridge 10 is referred to as a right side of the magnetic tape cartridge 10. In the following description on the structure, "right" indicates the right side of the magnetic tape cartridge 10.

In the following description, for convenience of description, in FIG. 1, a direction perpendicular to the direction of the arrow A and the direction of the arrow B is indicated by an arrow C, a direction of the arrow C is referred to as an upper direction of the magnetic tape cartridge 10, and a side in the upper direction of the magnetic tape cartridge 10 is referred to as an upper side of the magnetic tape cartridge 10. In the following description on the structure, "upper" indicates the upper side of the magnetic tape cartridge 10.

In the following description, for convenience of description, in FIG. 1, a direction opposite to the front direction of the magnetic tape cartridge 10 is referred to as a rear direction of the magnetic tape cartridge 10, and a side in the rear direction of the magnetic tape cartridge 10 is referred to as a rear side of the magnetic tape cartridge 10. In the following description on the structure, "rear" indicates the rear side of the magnetic tape cartridge 10.

In the following description, for convenience of description, in FIG. 1, a direction opposite to the upper direction of the magnetic tape cartridge 10 is referred to as a lower direction of the magnetic tape cartridge 10, and a side in the lower direction of the magnetic tape cartridge 10 is referred to as a lower side of the magnetic tape cartridge 10. In the following description on the structure, "lower" indicates the lower side of the magnetic tape cartridge 10.

In the following description, LTO will be described as an example of the specification of the magnetic tape cartridge 10. In the following description, although description will be provided on an assumption that the specification shown in Table 1 described below is applied to LTO according to the technique of the present disclosure, this is merely an example, and LTO according to the technique of the present disclosure may conform to the specification of IBM3592 magnetic tape cartridge.

TABLE 1

| Communication Command Classification | ISO14443 Standard | LTO Specification |
|---|---|---|
| REQA to SELECT Series | 86 or 91 μs | 86 or 91 μs ("1172/13.56 (MHz)" or "1236/13.56 (MHz)") |
| READ Series | Unspecified | 86 or 91 μs ("1172/13.56 (MHz)" or "1236/13.56 (MHz)") |
| WRITE Series | Unspecified | about 10.02 ms ("135828/13.56 (MHz)" or "135892/13.56 (MHz)") |

In Table 1, "REQA to SELECT Series" means a polling command described below. In "REQA to SELECT Series", at least a "Request A" command, a "Request SN" command, and a "Select" command are included. "Request A" is a command that inquires a cartridge memory about what type of cartridge memory is. In the embodiment, "Request A" is one kind; however, the technique of the present disclosure is not limited thereto, and "Request A" may be a plurality of kinds. "Request SN" is a command that inquires the cartridge memory about a serial number. "Select" is a command that notifies the cartridge memory beforehand of preparation of reading and writing. READ Series is a command corresponding to a read-out command described below. WRITE Series is a command corresponding to a write-in command described below.

As shown in FIG. 1 as an example, the magnetic tape cartridge 10 has a substantially rectangular shape in plan view, and comprises a box-shaped case 12. The case 12 is formed of resin, such as polycarbonate, and comprises an upper case 14 and a lower case 16. The upper case 14 and the lower case 16 are bonded by welding (for example, ultrasonic welding) and screwing in a state in which a lower peripheral edge surface of the upper case 14 and an upper peripheral edge surface of the lower case 16 are brought into contact with each other. A bonding method is not limited to welding and screwing, and other bonding methods may be used.

Inside the case 12, a cartridge reel 18 is rotatably housed. The cartridge reel 18 comprises a reel hub 18A, an upper flange 18B1, and a lower flange 18B2. The reel hub 18A is formed in a cylindrical shape. The reel hub 18A is a shaft center portion of the cartridge reel 18, has a shaft center direction along an up-down direction of the case 12, and is disposed in a center portion of the case 12. Each of the upper flange 18B1 and the lower flange 18B2 is formed in an annular shape. A center portion in plan view of the upper flange 18B1 is fixed to an upper end portion of the reel hub 18A, and a center portion in plan view of the lower flange 18B2 is fixed to a lower end portion of the reel hub 18A. A magnetic tape MT is wound around an outer peripheral surface of the reel hub 18A, and an end portion in a width direction of the magnetic tape MT is held by the upper flange 18B1 and the lower flange 18B2. The reel hub 18A and the lower flange 18B2 may be molded integrally.

An opening 12B is formed on a front side of a right wall 12A of the case 12. The magnetic tape MT is pulled out from the opening 12B.

Figure 2:
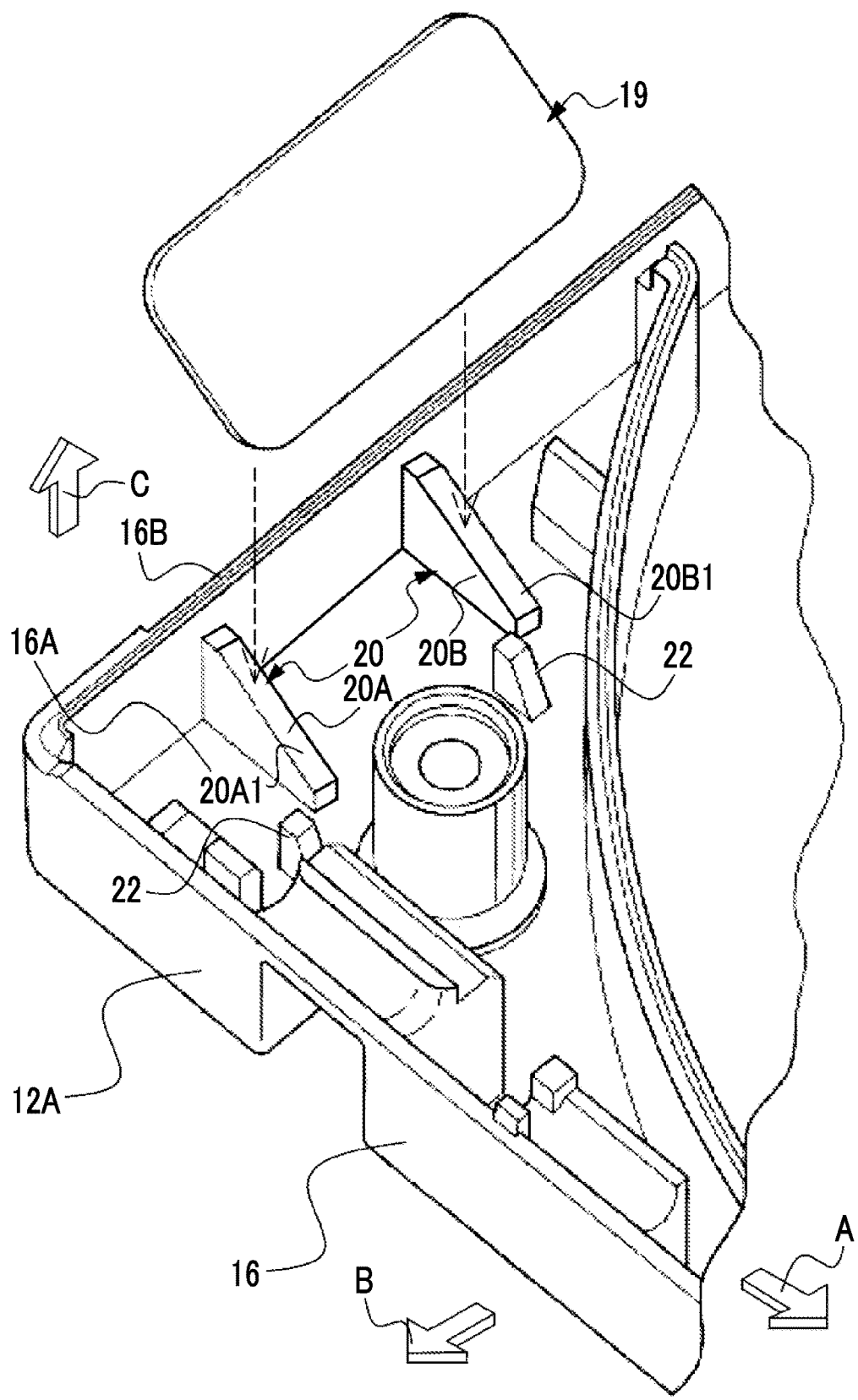
FIG. 2 is a schematic perspective view showing an example of the structure of a rear right end portion inside a lower case of the magnetic tape cartridge according to the embodiment.

As shown in FIG. 2 as an example, a cartridge memory 19 is housed in a rear right end portion of the lower case 16. The cartridge memory 19 is an example of a "noncontact communication medium" according to the technique of the present disclosure. In the embodiment, a so-called passive type RFID tag is employed as the cartridge memory 19.

Management information is stored in the cartridge memory 19. The management information is information for managing the magnetic tape cartridge 10. Examples of the management information include identification information capable of specifying the magnetic tape cartridge 10, a recording capacity of the magnetic tape MT, the outline of information (hereinafter, referred to as "recorded information") recorded on the magnetic tape MT, items of the recorded information, and information indicating a recording format of the recorded information.

The cartridge memory 19 performs communication with an external device (not shown) in a noncontact manner. Examples of the external device include a reading and writing device that is used in a production process of the magnetic tape cartridge 10 and a reading and writing device (for example, a noncontact reading and writing device 50 shown in FIGS. 4 to 6) that is used in a magnetic tape drive (for example, the magnetic tape drive 30 shown in FIG. 4).

The external device performs reading and writing of various kinds of information to the cartridge memory 19 in a noncontact manner. Although details will be described below, the cartridge memory 19 generates power by electromagnetically acting on a magnetic field from the external device. Then, the cartridge memory 19 operates using the generated power and performs transfer of various kinds of information with the external device by performing communication with the external device through the magnetic field. A communication system may be, for example, a system conforming to a known standard, such as ISO14443 or ISO18092, or may be a system conforming to the LTO Specification of ECMA319.

As shown in FIG. 2 as an example, a support member 20 is provided on an inner surface of a bottom plate 16A in the rear right end portion of the lower case 16. The support member 20 is a pair of inclined mounts that supports the cartridge memory 19 from below in an inclined state. A pair of inclined mounts is a first inclined mount 20A and a second inclined mount 20B. The first inclined mount 20A and the second inclined mount 20B are disposed at an interval in a right-left direction of the case 12 and are integrated with an inner surface of a rear wall 16B of the lower case 16 and the inner surface of the bottom plate 16A. The first inclined mount 20A has an inclined surface 20A1, and the inclined surface 20A1 is inclined downward from the inner surface of the rear wall 16B toward the inner surface of the bottom plate 16A. An inclined surface 20B1 is also inclined downward from the inner surface of the rear wall 16B toward the inner surface of the bottom plate 16A.

In front of the support member 20, a pair of position restriction ribs 22 is disposed at an interval in the right-left direction. A pair of position restriction ribs 22 is provided upright on the inner surface of the bottom plate 16A and restricts a position of a lower end portion of the cartridge memory 19 in a state of being disposed on the support member 20.

Figure 3:
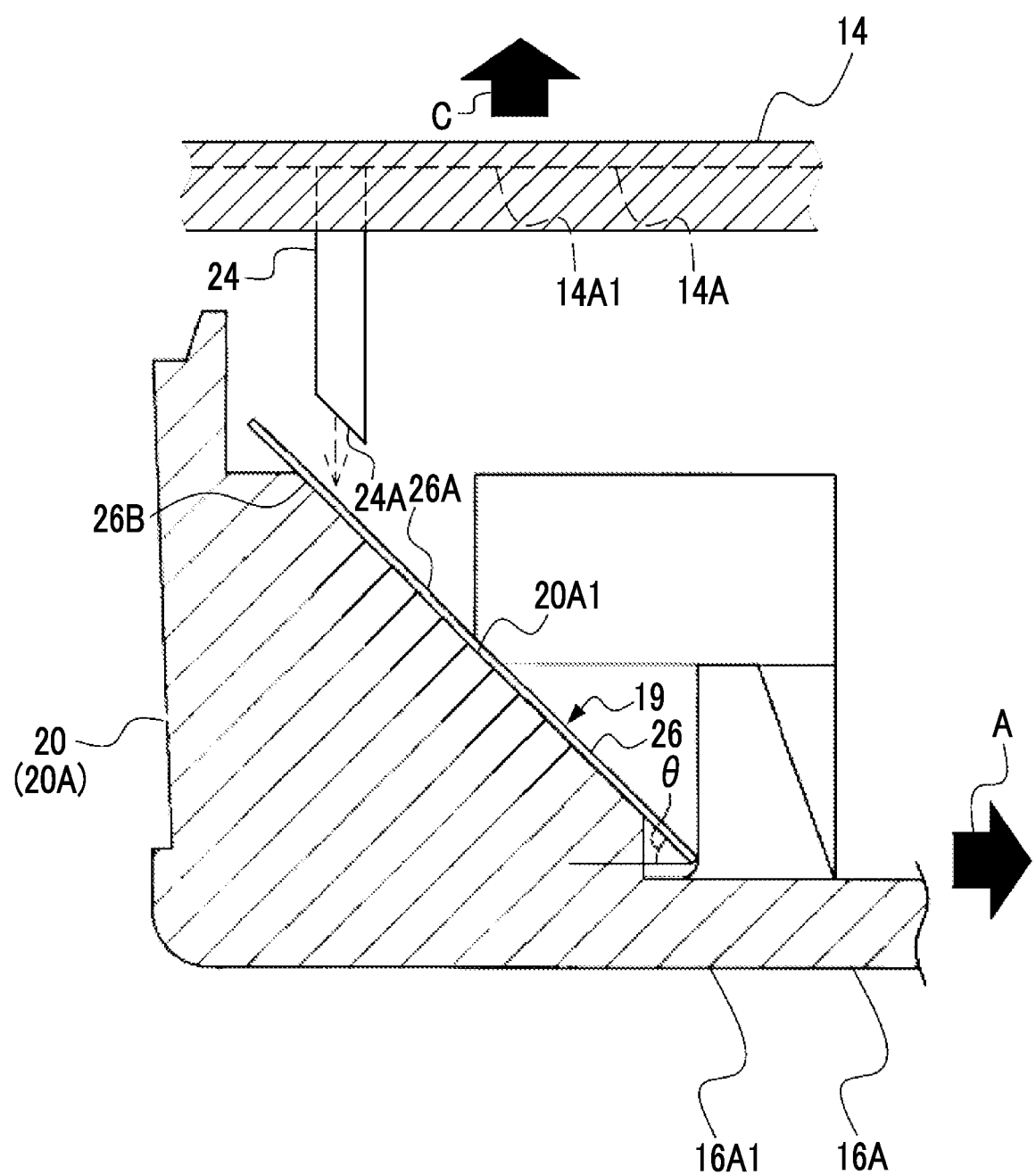
FIG. 3 is a side cross-sectional view showing an example of a support member provided on an inner surface of the lower case of the magnetic tape cartridge according to the embodiment.

As shown in FIG. 3 as an example, a reference surface 16A1 is formed on an outer surface of the bottom plate 16A. The reference surface 16A1 is a plane. Here, the plane indicates a surface parallel to a horizontal plane in a case where the lower case 16 is placed on the horizontal plane such that the bottom plate 16A turns toward a lower side. An inclination angle θ of the support member 20, that is, an inclination angle of each of the inclined surface 20A1 and the inclined surface 20B1 is 45 degrees with respect to the reference surface 16A1. The inclination angle of 45 degrees is merely an example, and may be in a range of "0 degrees<inclination angle θ<45 degrees" or may be equal to or greater than 45 degrees.

The cartridge memory 19 comprises a substrate 26. The substrate 26 is an example of a "substrate" according to the technique of the present disclosure. The substrate 26 has a substantially rectangular flat plate shape, and has two surfaces, that is, a front surface 26A and a back surface 26B in a thickness direction. The substrate 26 is placed on the support member 20 such that the back surface 26B of the substrate 26 turns toward a lower side, and the support member 20 supports the back surface 26B of the substrate 26 from below. A part of the back surface 26B of the substrate 26 is in contact with the inclined surface of the support member 20, that is, the inclined surfaces 20A1 and 20B1, and the front surface 26A of the substrate 26 is exposed to an inner surface 14A1 side of a top plate 14A. The front surface 26A and the back surface 26B are an example of "a plurality of surfaces" according to the technique of the present disclosure. The front surface 26A is an example of a "first surface" according to the technique of the present disclosure, and the back surface 26B is an example of a "second surface" according to the technique of the present disclosure.

The upper case 14 comprises a plurality of ribs 24. A plurality of ribs 24 are disposed at intervals in the right-left direction of the case 12. A plurality of ribs 24 are provided to protrude downward from the inner surface 14A1 of the top plate 14A of the upper case 14, and a distal end surface 24A of each rib 24 has an inclined surface corresponding to the inclined surfaces 20A1 and 20B1. That is, the distal end surface 24A of each rib 24 is inclined at 45 degrees with respect to the reference surface 16A1.

In a case where the upper case 14 is bonded to the lower case 16 as described above in a state in which the cartridge memory 19 is disposed on the support member 20, the distal end surface 24A of each rib 24 comes into contact with the substrate 26 from the front surface 26A side, and the substrate 26 is pinched by the distal end surface 24A of each rib 24 and the inclined surface of the support member 20. With this, a position in an up-down direction of the cartridge memory 19 is restricted by the ribs 24.

Figure 4:
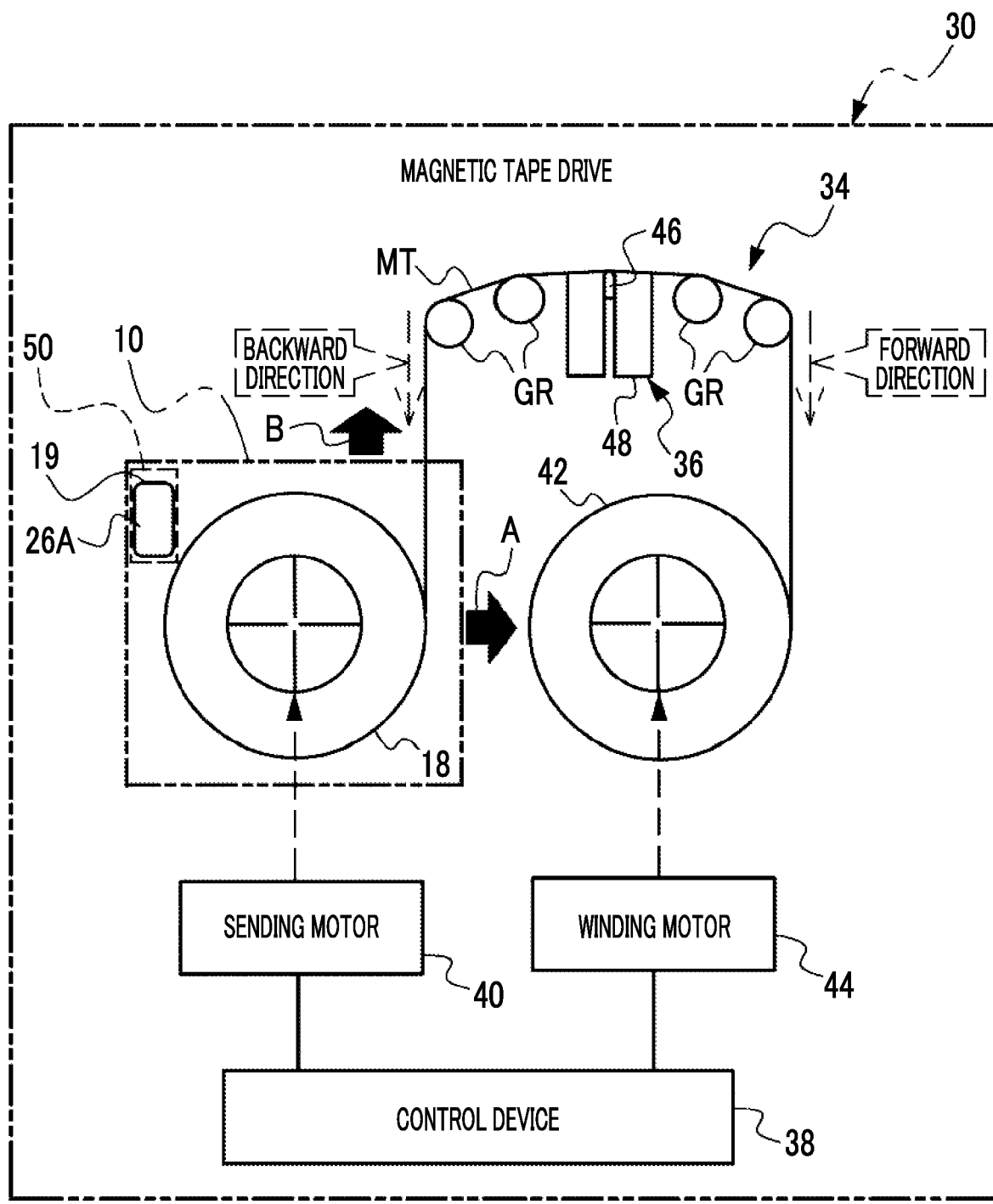
FIG. 4 is a schematic configuration diagram showing an example of the hardware configuration of the magnetic tape drive according to the embodiment.

As shown in FIG. 4 as an example, the magnetic tape drive 30 comprises a transport device 34, a reading head 36, and a control device 38. The magnetic tape cartridge 10 is loaded into the magnetic tape drive 30. The magnetic tape drive 30 is a device that pulls out the magnetic tape MT from the magnetic tape cartridge 10 and reads recorded information from the pulled-out magnetic tape MT using the reading head 36 by a linear serpentine method. In the embodiment, in order words, reading of the recorded information indicates reproduction of the recorded information.

The control device 38 controls the entire magnetic tape drive 30. In the embodiment, although the control device 38 is realized by an ASIC, the technique of the present disclosure is not limited thereto. For example, the control device 38 may be realized by an FPGA. Alternatively, the control device 38 may be realized by a computer including a CPU, a ROM, and a RAM. In addition, the control device 38 may be realized by combining two or more of an AISC, an FPGA, and a computer. That is, the control device 38 may be realized by a combination of a hardware configuration and a software configuration.

The transport device 34 is a device that selectively transports the magnetic tape MT in a forward direction and a backward direction, and comprises a sending motor 40, a winding reel 42, a winding motor 44, a plurality of guide rollers GR, and the control device 38.

The sending motor 40 rotationally drives the cartridge reel 18 in the magnetic tape cartridge 10 under the control of the control device 38. The control device 38 controls the sending motor 40 to control a rotation direction, a rotation speed, rotation torque, and the like of the cartridge reel 18.

The winding motor 44 rotationally drives the winding reel 42 under the control of the control device 38. The control device 38 controls the winding motor 44 to control a rotation direction, a rotation speed, rotation torque, and the like of the winding reel 42.

In a case where the magnetic tape MT is wound around the winding reel 42, the sending motor 40 and the winding motor 44 are rotated by the control device 38 such that the magnetic tape MT runs in the forward direction. Rotation speeds, rotation torque, and the like of the sending motor 40 and the winding motor 44 are adjusted depending on a speed of the magnetic tape MT wound around the winding reel 42.

In a case where the magnetic tape MT is rewound to the cartridge reel 18, the sending motor 40 and the winding motor 44 are rotated by the control device 38 such that the magnetic tape MT runs in the backward direction. Rotation speeds, rotation torque, and the like of the sending motor 40 and the winding motor 44 are adjusted depending on a speed of the magnetic tape MT wound around the winding reel 42.

The rotation speed, the rotation torque, and the like of each of the sending motor 40 and the winding motor 44 are adjusted in this manner, whereby tension in a predetermined range is applied to the magnetic tape MT. Here, the predetermined range indicates, for example, a range of tension obtained from a computer simulation and/or a test with a real machine as a range of tension in which data can be read from the magnetic tape MT by the reading head 36.

In the embodiment, although the rotation speed, the rotation torque, and the like of each of the sending motor 40 and the winding motor 44 are controlled such that the tension of the magnetic tape MT is controlled, the technique of the present disclosure is not limited thereto. For example, the tension of the magnetic tape MT may be controlled using a dancer roller or may be controlled by drawing the magnetic tape MT to a vacuum chamber.

Each of a plurality of guide rollers GR is a roller that guides the magnetic tape MT. A running path of the magnetic tape MT is determined by separately disposing a plurality of guide rollers GR at positions straddling over the reading head 36 between the magnetic tape cartridge 10 and the winding reel 42.

The reading head 36 comprises a reading element 46 and a holder 48. The reading element 46 is held by the holder 48 to come into contact with the magnetic tape MT during running, and reads recorded information from the magnetic tape MT transported by the transport device 34.

The magnetic tape drive 30 comprises the noncontact reading and writing device 50. The noncontact reading and writing device 50 is an example of an "outside" according to the technique of the present disclosure. The noncontact reading and writing device 50 is disposed to confront the back surface 26B of the cartridge memory 19 below the magnetic tape cartridge 10 in a state in which the magnetic tape cartridge 10 is loaded. The state in which the magnetic tape cartridge 10 is loaded into the magnetic tape drive 30 indicates, for example, a state in which the magnetic tape cartridge 10 reaches a predetermined position as a position where reading of recorded information from the magnetic tape MT by the reading head 36 starts.

Figure 5:
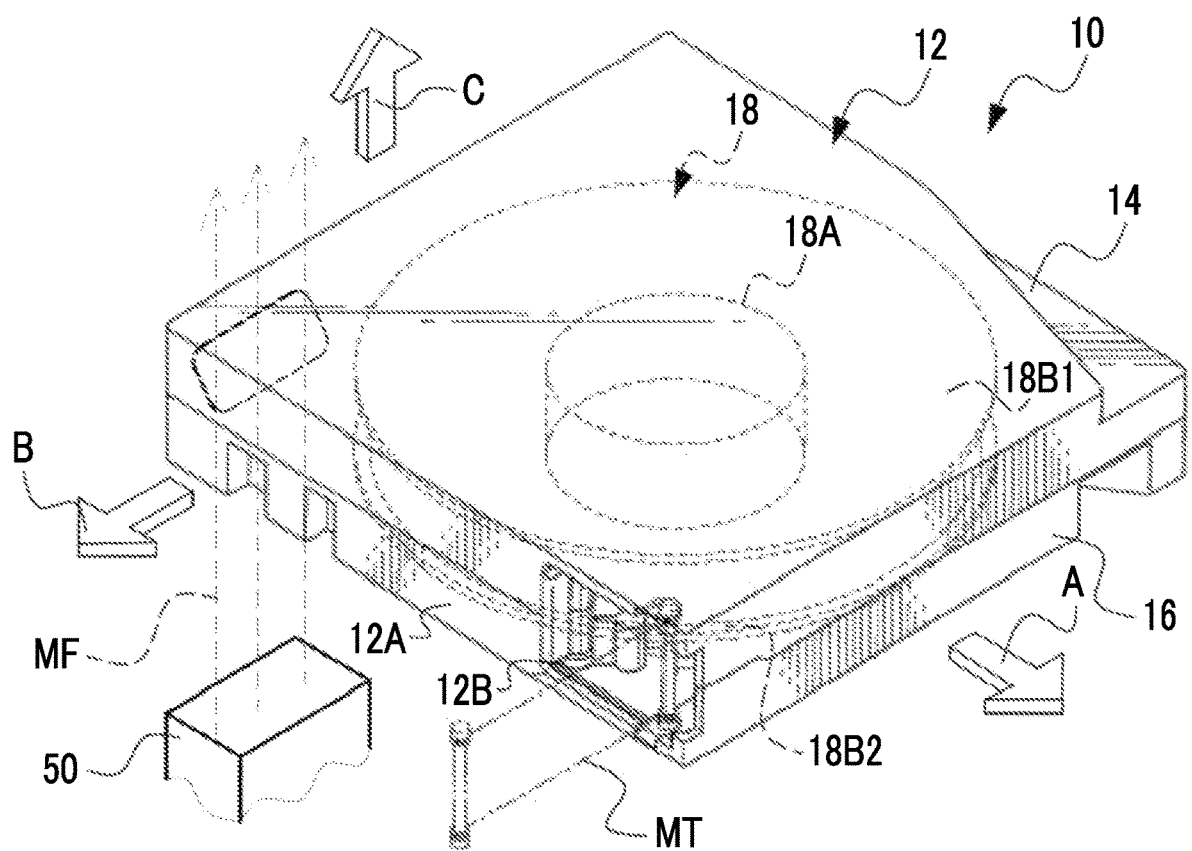
FIG. 5 is a schematic perspective view showing an example of an aspect in which a magnetic field is discharged from a lower side of the magnetic tape cartridge according to the embodiment by a noncontact reading and writing device.

As shown in FIG. 5 as an example, the noncontact reading and writing device 50 emits a magnetic field MF from below the magnetic tape cartridge 10 toward the cartridge memory 19. The magnetic field MF passes through the cartridge memory 19. The magnetic field MF is an example of a "magnetic field" according to the technique of the present disclosure.

Figure 6:
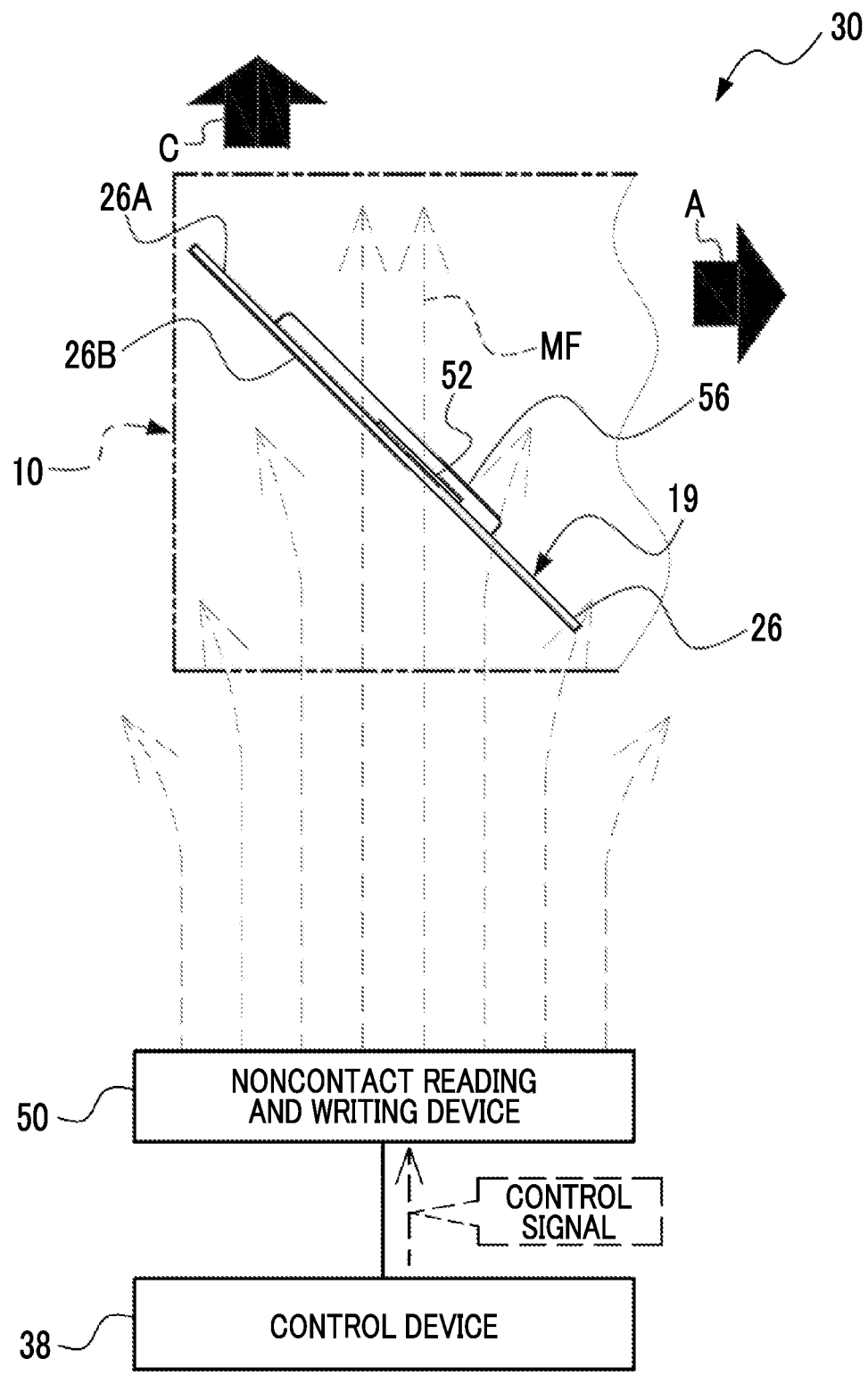
FIG. 6 is a conceptual diagram showing an example of an aspect in which a magnetic field is applied from the noncontact reading and writing device to a cartridge memory in the magnetic tape cartridge according to the embodiment.

As shown in FIG. 6 as an example, the noncontact reading and writing device 50 is connected to the control device 38. The control device 38 outputs a control signal for controlling the cartridge memory 19 to the noncontact reading and writing device 50. The noncontact reading and writing device 50 emits the magnetic field MF toward the cartridge memory 19 in association with the control signal input from the control device 38. The magnetic field MF passes through the cartridge memory 19 from the back surface 26B side to the front surface 26A side.

The noncontact reading and writing device 50 spatially transmits a command signal to the cartridge memory 19 under the control of the control device 38. Though described below in detail, the command signal is a signal indicating a command to the cartridge memory 19. In a case where the command signal is spatially transmitted from the noncontact reading and writing device 50 to the cartridge memory 19, the command signal is included in the magnetic field MF in association with an instruction from the control device 38 by the noncontact reading and writing device 50. In other words, the command signal is superimposed on the magnetic field MF. That is, the noncontact reading and writing device 50 transmits the command signal to the cartridge memory 19 through the magnetic field MF under the control of the control device 38.

An IC chip 52 is mounted on a front surface 26A of the cartridge memory 19. The IC chip 52 is adhered to the front surface 26A. The IC chip 52 is sealed with a sealing material 56 on the front surface 26A of the cartridge memory 19. Here, as the sealing material 56, ultraviolet curable resin that is cured by ultraviolet rays is employed. The ultraviolet curable resin is merely an example, and photocurable resin that is cured by light in a wavelength range other than ultraviolet rays may be used as the sealing material 56, thermosetting resin may be used as the sealing material 56, or an adhesive may be used as the sealing material 56. The IC chip 52 is an example of a "processing circuit" according to the technique of the present disclosure.

Figure 7:
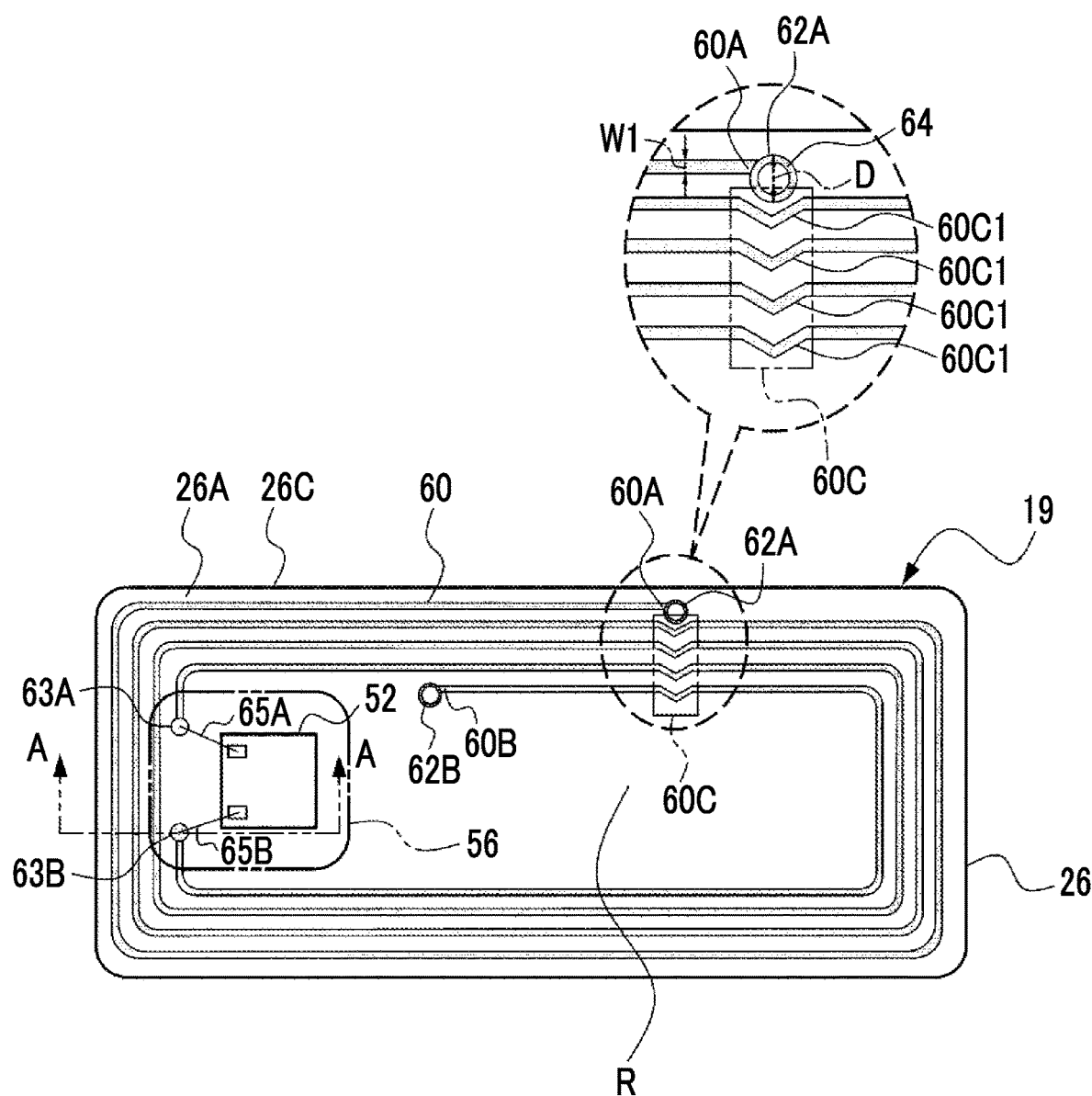
FIG. 7 is a top view showing an example of a front surface structure of the cartridge memory according to the embodiment.

As shown in FIG. 7 as an example, a first coil 60 is formed on the front surface 26A of the substrate 26 of the cartridge memory 19. Here, as a material of the first coil 60, copper foil is employed. The copper foil is merely an example, and for example, other kinds of conductive materials, such as aluminum foil, may be employed. The first coil 60 induces an induced current with the application of the magnetic field MF (see FIGS. 5 and 6) from the noncontact reading and writing device 50. The first coil 60 is an example of an "antenna coil" according to the technique of the present disclosure.

The first coil 60 is wound in a loop shape along an outer periphery 26C of the substrate 26. An outer peripheral end 60A of the first coil 60 is connected to a first through-hole 62A provided in the substrate 26, and an inner peripheral end 60B of the first coil 60 is connected to a second through-hole 62B of the substrate 26. Each of the first through-hole 62A and the second through-hole 62B is formed in the substrate 26 to pass through the front surface 26A and the back surface 26B of the substrate 26, and has a plated layer 64. Examples of plating used for the plated layer 64 include copper plating. The copper plating is merely an example, and may be, for example, plating of other kinds of conductive materials, such as aluminum plating. The outer periphery 26C is an example of an "outer periphery of" according to the technique of the present disclosure.

In the example shown in FIG. 7, although examples of the first through-hole 62A and the second through-hole 62B include a cylindrical through-hole having a hollow portion, the technique of the present disclosure is not limited thereto, a through-hole having no hollow portion, that is, a pillar-shaped (for example, columnar) through-hole formed of a conductive material may be employed.

A position of the first through-hole 62A deviates to an inner peripheral side of the first coil 60 in a winding direction with respect to an outer peripheral side on the front surface 26A. In other words, this means that a position of the outer peripheral end 60A deviates to the outer peripheral side of the first coil 60 in the winding direction with respect to the inner peripheral side on the front surface 26A.

A diameter D of each of the first through-hole 62A and the second through-hole 62B is greater than a width W1 of the first coil 60. The diameter D of each of the first through-hole 62A and the second through-hole 62B is, for example, three times the width W1 of the first coil 60. As shown in FIG. 7 as an example, the outer peripheral end 60A is connected to the first through-hole 62A on the outer periphery 26C side of the substrate 26 with respect to the center of the first through-hole 62A.

A bent portion 60C that is a portion of the first coil 60 on the front surface 26A facing the position of the outer peripheral end 60A and the position of the first through-hole 62A has a shape recessed to the inner peripheral side in the winding direction. Here, as for how much the bent portion 60C is recessed to the inner peripheral side in the winding direction, the bent portion 60C is recessed to the inner peripheral side of the first coil 60 in the winding direction to such an extent to avoid contact with at least the first through-hole 62A. The bent portion 60C is a plurality of (in the example shown in FIG. 7, four) conductive wire portions 60C1. A plurality of conductive wire portions 60C1 overlap along the inner peripheral side of the first coil 60 in the winding direction in plan view with respect to the front surface 26A. In more detail, a plurality of conductive wire portions 60C1 are disposed at regular intervals along the inner peripheral side of the first coil 60 in the winding direction in plan view with respect to the front surface 26A. An outermost peripheral conductive wire portion 60C1 among a plurality of conductive wire portions 60C1 has a shape recessed to the inner peripheral side of the first coil 60 in the winding direction to avoid contact with the first through-hole 62A, and the remaining conductive wire portions 60C1 are recessed to the inner peripheral side of the first coil 60 in the winding direction in the same shape and with the same degree as the outermost peripheral conductive wire portion 60C1. That is, a plurality of conductive wire portions 60C1 have a shape recessed to the inner peripheral side of the first coil 60 in the winding direction in the same shape and with the same degree, and are offset at regular intervals from the outer peripheral side to the inner peripheral side of the first coil 60 in the winding direction.

In the example shown in FIG. 7, the bent portion 60C has a shape bent in a V shape to the inner peripheral side in the winding direction. The first coil 60 is laid out on the front surface 26A of the substrate 26 by a design tool or the like of a print substrate running on a computer, for example. The bent portion 60C prevents the first coil 60 wound along the outer periphery 26C of the substrate 26 from overlapping the first through-hole 62A. The bent portion 60C is an example of "a portion of an antenna coil facing a position of a through-hole" according to the technique of the present disclosure.

A first conduction portion 63A and a second conduction portion 63B are provided in the middle of the first coil 60. The IC chip 52 is electrically connected to the first conduction portion 63A and the second conduction portion 63B by a wire connection method. Specifically, the first conduction portion 63A and the second conduction portion 63B have solder, and one terminal of a positive electrode terminal and a negative electrode terminal of the IC chip 52 is soldered to the first conduction portion 63A through wiring 65A, and the other terminal is soldered to the second conduction portion 63B through wiring 65B. The IC chip 52 is disposed on the inner peripheral side of the first coil 60 in the winding direction.

Figure 8:
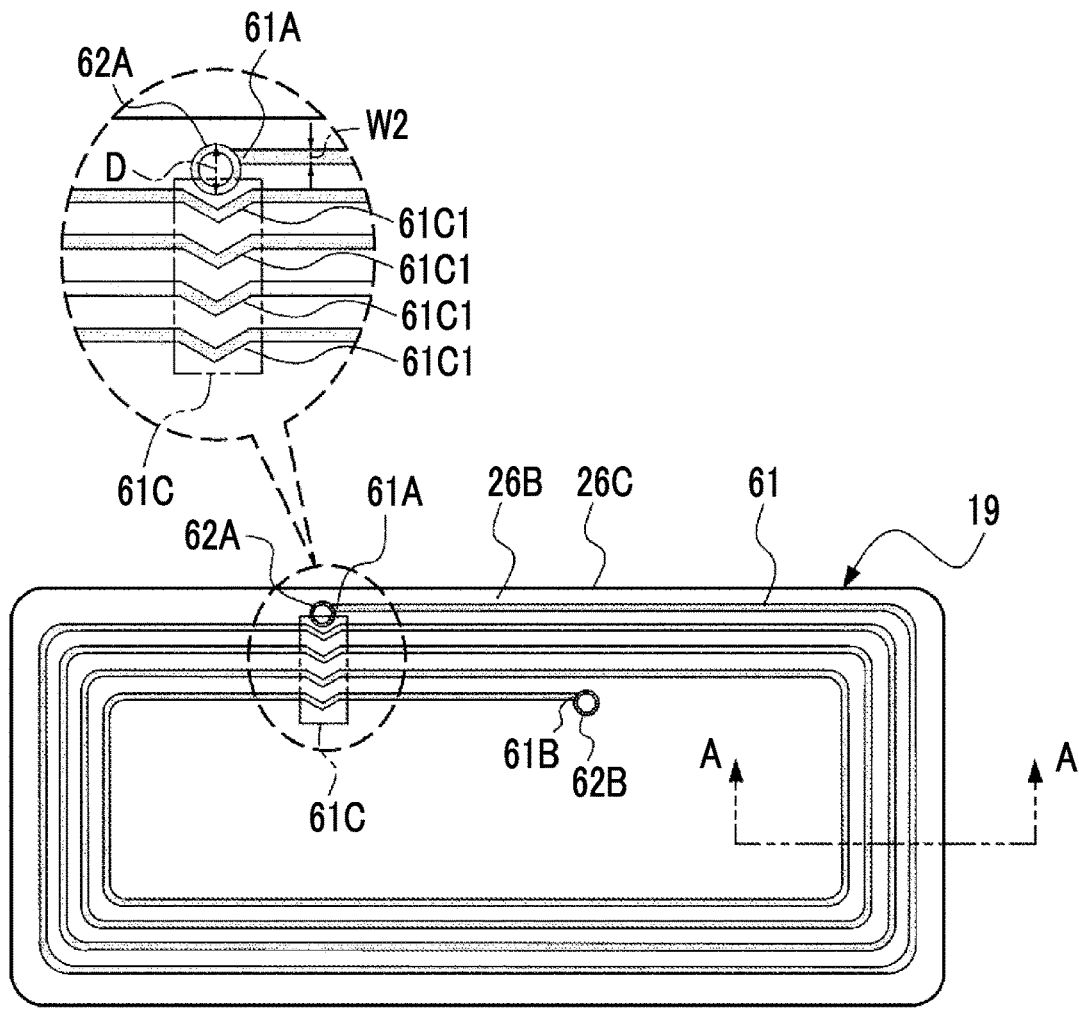
FIG. 8 is a bottom view showing an example of a back surface structure of the cartridge memory according to the embodiment.

As shown in FIG. 8 as an example, a second coil 61 is formed on the back surface 26B of the substrate 26 of the cartridge memory 19. Here, as a material of the second coil 61, copper foil is employed. The copper foil is merely an example, and for example, other kinds of conductive materials, such as aluminum foil, may be employed. The second coil 61 is an example of an "auxiliary antenna coil" according to the technique of the present disclosure.

The second coil 61 is wound in a loop shape along the outer periphery 26C of the substrate 26. An outer peripheral end 61A of the second coil 61 is connected to the first through-hole 62A provided in the substrate 26, and an inner peripheral end 61B of the second coil 61 is connected to the second through-hole 62B provided in the substrate 26. With this, on the back surface 26B of the substrate 26, the second coil 61 is electrically connected to the outer peripheral end 60A and the inner peripheral end 60B of the first coil 60 through the first through-hole 62A and the second through-hole 62B.

The diameter D of each of the first through-hole 62A and the second through-hole 62B is greater than a width W2 of the second coil 61. The diameter D of each of the first through-hole 62A and the second through-hole 62B is, for example, three times the width W2 of the second coil 61. As shown in FIG. 8 as an example, the outer peripheral end 61A is connected to the first through-hole 62A on the outer periphery 26C side of the substrate 26 with respect to the center of the first through-hole 62A.

On the back surface 26B, a position of the first through-hole 62A deviates to an inner peripheral side with respect to an outer peripheral side of the second coil 61 in a winding direction. In other words, this means that a position of the outer peripheral end 61A deviates to the outer peripheral side with respect to the inner peripheral side of the second coil 61 in the winding direction on the back surface 26B.

On the back surface 26B, a bent portion 61C that is a portion of the second coil 61 facing the position of the outer peripheral end 61A and the position of the first through-hole 62A has a shape recessed to the inner peripheral side in the winding direction. Here, as for how much the bent portion 61C is recessed to the inner peripheral side in the winding direction, the bent portion 61C is recessed to the inner peripheral side of the second coil 61 in the winding direction to such an extent to avoid contact with at least the first through-hole 62A. The bent portion 61C is a plurality of (in the example shown in FIG. 8, four) conductive wire portions 61C1. A plurality of conductive wire portions 61C1 overlap along the inner peripheral side on the second coil 61 in the winding direction in plan view with respect to the back surface 26B. In more detail, a plurality of conductive wire portions 61C1 are disposed at regular intervals along the inner peripheral side of the second coil 61 in the winding direction in plan view with respect to the back surface 26B. An outermost peripheral conductive wire portion 61C1 among a plurality of conductive wire portions 61C1 has a shape recessed to the inner peripheral side of the second coil 61 in the winding direction to avoid contact with the first through-hole 62A, and the remaining conductive wire portions 61C1 are recessed to the inner peripheral side of the second coil 61 in the winding direction in the same shape and with the same degree as the outermost peripheral conductive wire portion 61C1. That is, a plurality of conductive wire portions 61C1 have a shape recessed to the inner peripheral side of the second coil 61 in the winding direction in the same shape and with the same degree, and are offset at regular intervals from the outer peripheral side to the inner peripheral side of the second coil 61 in the winding direction.

In the example shown in FIG. 8, the bent portion 61C has a shape bent in a V shape. The second coil 61 is laid out on the back surface 26B of the substrate 26 by a design tool or the like of a print substrate running on a computer, for example. The bent portion 61C prevents the second coil 61 wound along the outer periphery 26C of the substrate 26 from overlapping the first through-hole 62A. The bent portion 61C is an example of "a portion of an auxiliary antenna coil facing a position of a through-hole" according to the technique of the present disclosure.

Figure 9:
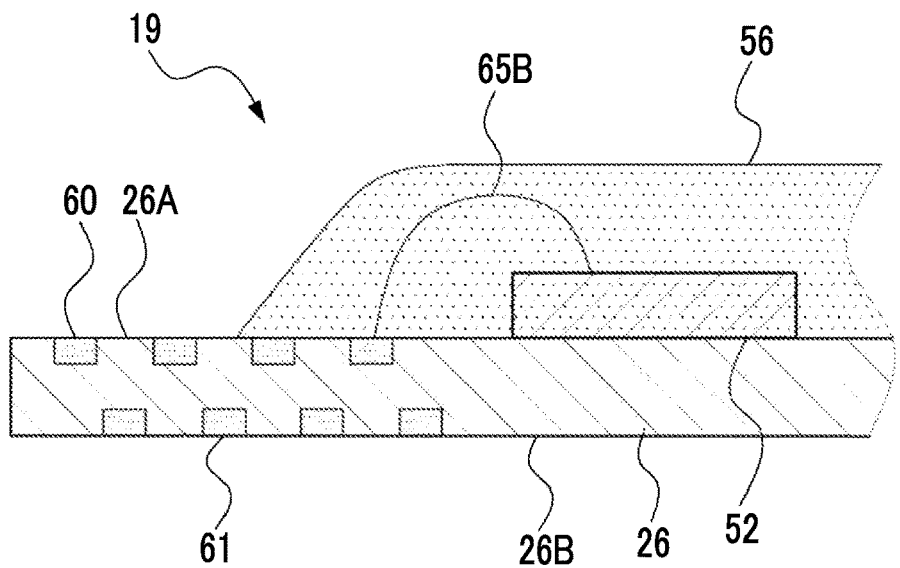
FIG. 9 is a schematic sectional view of the cartridge memory shown in FIGS. 11 and 12 taken along the line A-A.

FIG. 9 is an example of a schematic sectional view of the cartridge memory 19 taken along the line A-A. As shown in FIG. 9 as an example, the first coil 60 formed on the front surface 26A and the second coil 61 formed on the back surface 26B of the substrate 26 are disposed in a zigzag pattern in the thickness direction of the substrate 26. In general, in a case where the first coil 60 and the second coil 61 are disposed at overlapping positions in the thickness direction of the substrate 26, inductance components of the first coil 60 and the second coil 61 are coupled, and the first coil 60 and the second coil 61 are regarded as one thick conductive wire in characteristics. In contrast, according to the embodiment, since the first coil 60 and the second coil 61 are disposed in a zigzag pattern, inductance components are hardly coupled compared to a case where the first coil 60 and the second coil 61 are disposed at overlapping positions in the thickness direction of the substrate 26.

Figure 10:
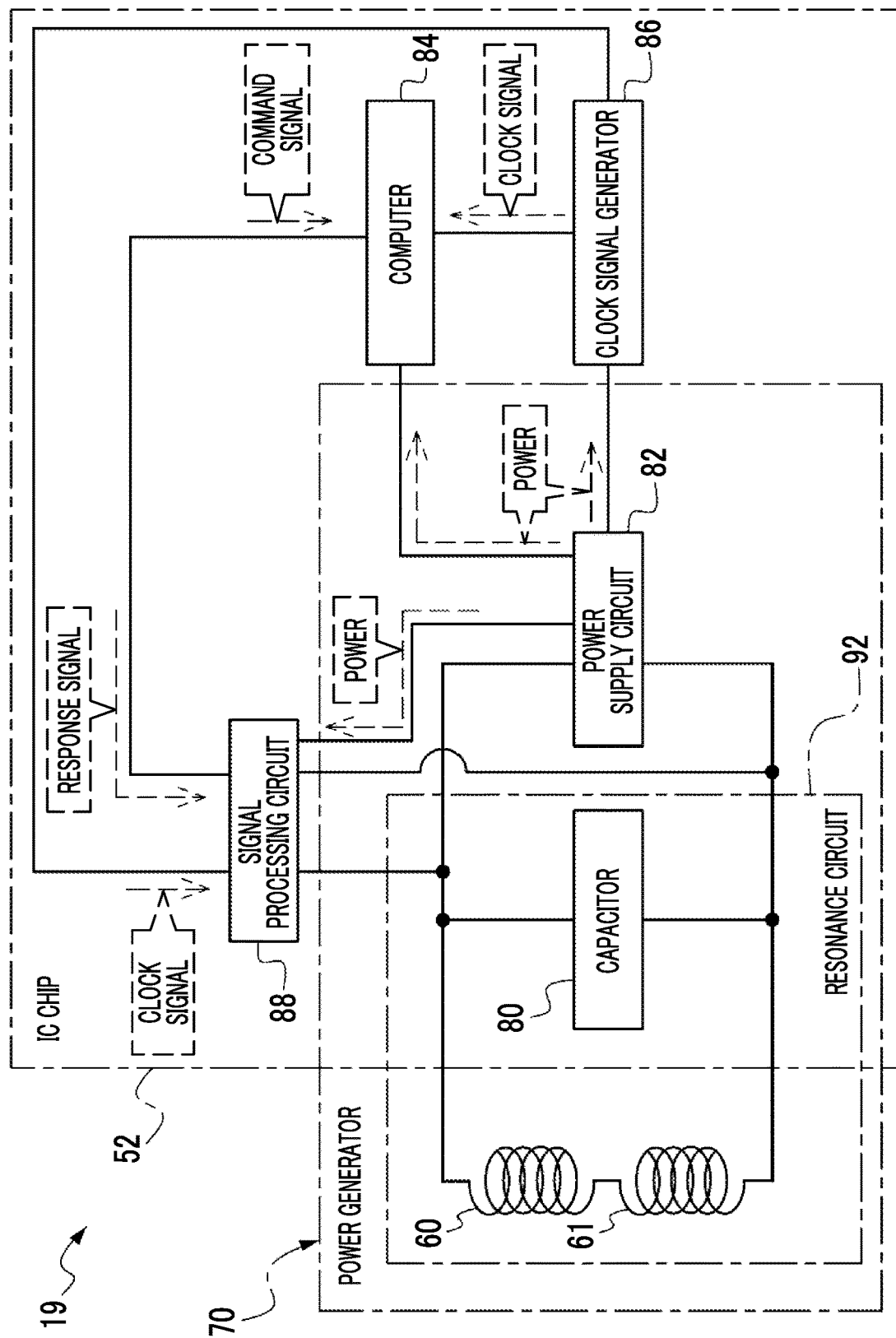
FIG. 10 is a schematic circuit diagram showing an example of the circuit configuration of the cartridge memory according to the embodiment.

As shown in FIG. 10 as an example, the IC chip 52 comprises a capacitor 80, a power supply circuit 82, a computer 84, a clock signal generator 86, and a signal processing circuit 88. The IC chip 52 functions as a control device for the cartridge memory 19 in a case where a control program is installed thereon.

The cartridge memory 19 comprises a power generator 70. The power generator 70 generates power with application of a magnetic field MF from the noncontact reading and writing device 50 to the first coil 60 formed on the front surface 26A and the second coil 61 formed on the back surface 26B of the substrate 26. Specifically, the power generator 70 generates alternating-current power using a resonance circuit 92, converts the generated alternating-current power into direct-current power, and outputs the direct-current power.

The power generator 70 has the resonance circuit 92 and the power supply circuit 82. The resonance circuit 92 comprises the first coil 60, the second coil 61, and the capacitor 80. The capacitor 80 is a capacitor incorporated in the IC chip 52, and the power supply circuit 82 is also a circuit incorporated in the IC chip 52. The first coil 60 and the second coil 61 are connected in series through the first through-hole 62A and the second through-hole 62B (see FIGS. 7 and 8). The capacitor 80 is connected in parallel with the first coil 60 and the second coil 61.

The resonance circuit 92 generates alternating-current power by generating a resonance phenomenon at a predetermined resonance frequency using an induced current induced by the first coil 60 and the second coil 61 with the magnetic field MF passing through the first coil 60 and the second coil 61 and outputs the generated alternating-current power to the power supply circuit 82. In the cartridge memory 19, the resonance circuit 92 is made to resonate at the predetermined resonance frequency with application of the magnetic field MF. The predetermined resonance frequency is, for example, 13.56 MHz. The resonance frequency is not limited to 13.56 MHz, and may be appropriately decided depending on the specification or the like of the cartridge memory 19 and/or the noncontact reading and writing device 50.

The power supply circuit 82 has a rectification circuit, a smoothing circuit, and the like. The rectification circuit is a full-wave rectification circuit having a plurality of diodes. The full-wave rectification circuit is merely an example, and a half-wave rectification circuit may be used. The smoothing circuit includes a capacitor and a resistor. The power supply circuit 82 converts the alternating-current power input from the resonance circuit 92 into direct-current power and supplies the converted direct-current power (hereinafter, simply referred to as "power") to various drive elements in the IC chip 52. Examples of various drive elements include the computer 84, the clock signal generator 86, and the signal processing circuit 88. In this way, power is supplied to various drive elements in the IC chip 52 by the power generator 70, whereby the IC chip 52 operates using power generated by the power generator 70.

The computer 84 comprises a CPU, an NVM, and a RAM (all are not shown). The control program and the management information are stored in the NVM. The CPU controls the operation of the cartridge memory 19 by reading the control program from the NVM and executing the control program on the RAM.

The CPU selectively executes polling processing, read-out processing, and write-in processing in response to the command signal input from the signal processing circuit 88. The polling processing is processing of establishing communication between the cartridge memory 19 and the noncontact reading and writing device 50, and is executed, for example, as preparation processing in a pre-stage of the read-out processing and the write-in processing. The read-out processing is processing of reading out the management information and the like from the NVM. The write-in processing is processing of writing the management information and the like in the NVM. All of the polling processing, the read-out processing, and the write-in processing (hereinafter, referred to as various kinds of processing in a case where there is no need for distinction) are executed by the CPU in association with clock signals generated by the clock signal generator 86. That is, the CPU executes various kinds of processing at a processing speed corresponding to the clock frequency.

The clock signal generator 86 generates a clock signal and outputs the clock signal to the computer 84. The computer 84 operates in association with the clock signal input from the clock signal generator 86.

The signal processing circuit 88 is connected to the resonance circuit 92. The signal processing circuit 88 has a decoding circuit and an encoding circuit (both are not shown). The decoding circuit of the signal processing circuit 88 extracts the command signal from the magnetic field MF received by the first coil 60 and the second coil 61, decodes the command signal, and outputs the command signal to the computer 84. The computer 84 outputs a response signal to the command signal to the signal processing circuit 88. That is, the computer 84 executes processing corresponding to the command signal input from the signal processing circuit 88 and outputs a processing result as a response signal to the signal processing circuit 88. In the signal processing circuit 88, in a case where the response signal is input from the computer 84, the encoding circuit of the signal processing circuit 88 encodes the response signal to modulate the response signal and outputs the response signal to the resonance circuit 92. The resonance circuit 92 transmits the response signal input from the encoding circuit of the signal processing circuit 88 to the noncontact reading and writing device 50 through the magnetic field MF. That is, in a case where the response signal is transmitted from the cartridge memory 19 to the noncontact reading and writing device 50, the response signal is included in the magnetic field MF. In other words, the response signal is superimposed on the magnetic field MF.

Next, the operation of cartridge memory 19 according to the embodiment will be described.

Figure 15:
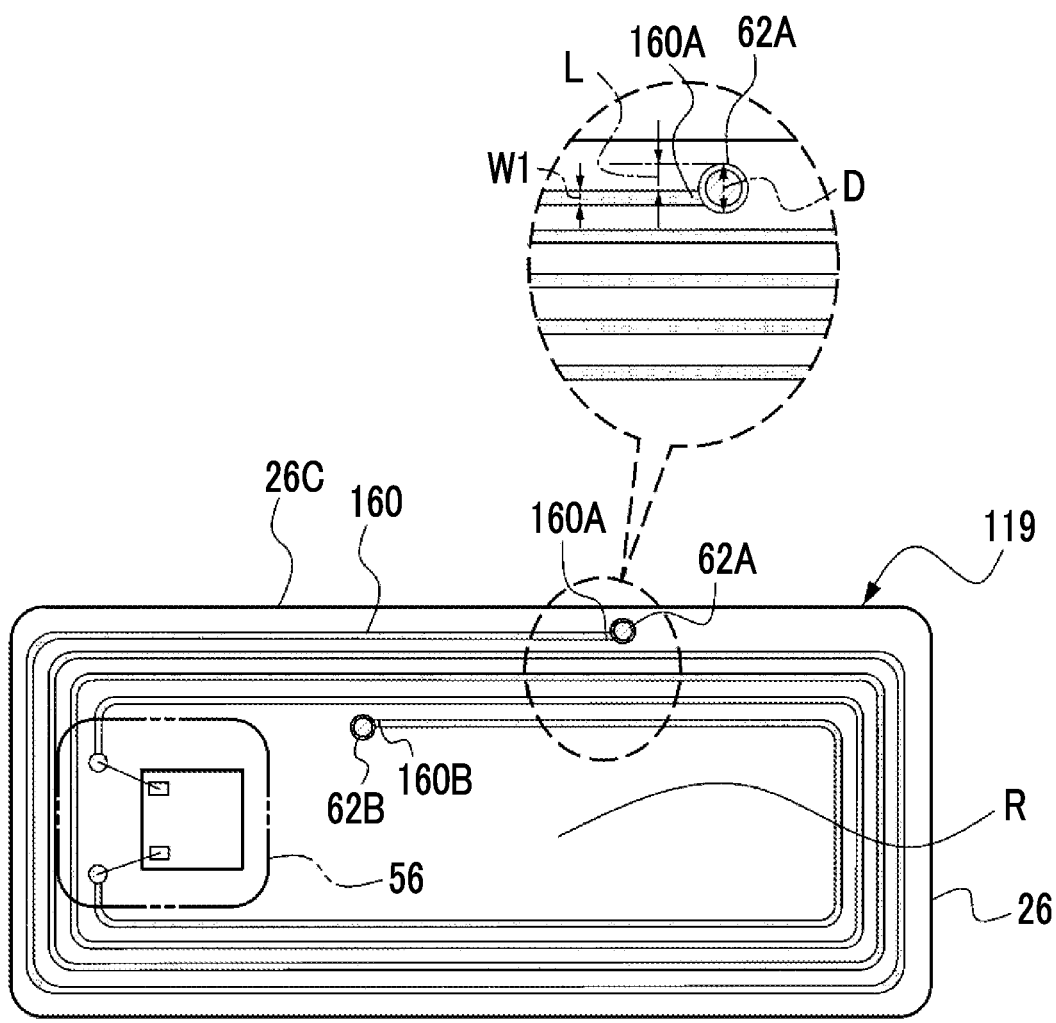
FIG. 15 is a top view showing an example of a front surface structure of a cartridge memory according to the related art.

As shown in FIG. 15 as an example, in a cartridge memory 119 according to a related art example, a first coil 160 is linearly wound in a loop shape along an outer periphery 26C of the substrate 26. An outer peripheral end 160A of the first coil 160 wound in a loop shape is connected to a first through-hole 62A provided in the substrate 26, and an inner peripheral end 160B of the first coil 160 is connected to a second through-hole 62B provided in the substrate 26. A diameter D of each of the first through-hole 62A and the second through-hole 62B is greater than a width W1 of the first coil 160. The outer peripheral end 160A of the first coil 160 is connected to the first through-hole 62A on the inner peripheral side of the substrate 26 with respect to the center of the first through-hole 62A.

That is, in the cartridge memory 119, the outer peripheral end 160A of the first coil 160 is connected to the first through-hole 62A on the inner peripheral side by a distance L compared to the cartridge memory 19 according to the embodiment shown in FIG. 7. That is, in the cartridge memory 19 according to the embodiment, the outer peripheral end 60A of the first coil 60 is connected to the first through-hole 62A on the outer periphery 26C side by the distance L and is disposed on the outer periphery 26C by the distance L compared to the cartridge memory 119 according to the related art example. Accordingly, in the cartridge memory 19 according to the embodiment, a region R on the inner peripheral side of the first coil 60 is widened compared to the cartridge memory 119 according to the related art example. As the region R on the inner peripheral side of the first coil 60 is widened, the number of lines of magnetic force passing through the region R increases, and power induced by the first coil 60 increases.

As described above, the cartridge memory 19 comprises the first coil 60 that is formed on the substrate 26 and induces power with application of the magnetic field MF from the noncontact reading and writing device 50, and the IC chip 52 that operates using the power induced by the first coil 60. The IC chip 52 is inserted in the middle of the first coil 60. The first coil 60 is wound in a loop shape along the outer periphery 26C of the substrate 26, and the bent portion 60C of the first coil 60 has a shape recessed to the inner peripheral side in the winding direction. Therefore, according to this configuration, it is possible to widen the region R of the inner peripheral side of the first coil 60 compared to the cartridge memory 119 according to the related art example.

The bent portion 60C of the first coil 60 has a shape bent in a V shape to the inner peripheral side in the winding direction. Therefore, according to this configuration, it is possible to dispose the first coil 60 near the outer periphery 26C of the substrate 26 while maintaining a predetermined distance from the outer peripheral end 60A of the first coil 60.

The substrate 26 has the front surface 26A and the back surface 26B in the thickness direction. The first coil 60 is formed on the front surface 26A. The outer peripheral end 60A and the inner peripheral end 60B of the first coil 60 are electrically connected through the second coil 61 on the back surface 26B. Therefore, according to this configuration, it is possible to obtain more power compared to a case where the outer peripheral end 60A and the inner peripheral end 60B of the first coil 60 are not connected.

The outer peripheral end 60A and the inner peripheral end 60B of the first coil 60 are electrically connected through the first through-hole 62A and the second through-hole 62B on the back surface 26B. Therefore, according to this configuration, it is possible to connect the outer peripheral end 60A and the inner peripheral end 60B of the first coil 60 in a space-saving manner compared to a case where the outer peripheral end 60A and the inner peripheral end 60B of the first coil 60 are connected by a wire.

The second coil 61 is formed on the back surface 26B and is wound in a loop shape along the outer periphery 26C of the substrate 26. Therefore, according to this configuration, it is possible to increase a winding number of the coil including the first coil 60 and the second coil 61 compared to a case where the second coil 61 is in a linear shape.

The bent portion 61C of the second coil 61 has a shape recessed to the inner peripheral side in the winding direction. Therefore, according to this configuration, it is possible to a region on the inner peripheral side of the second coil 61 compared to a case where the second coil 61 is linearly wound along the outer periphery 26C of the substrate 26.

The first coil 60 formed on the front surface 26A and the second coil 61 formed on the back surface 26B of the substrate 26 are disposed in a zigzag pattern in the thickness direction of the substrate 26. Therefore, according to this configuration, it is possible to obtain more power compared to a case where the first coil 60 and the second coil 61 are disposed at overlapping positions in the thickness direction.

The IC chip 52 is disposed on the inner peripheral side of the first coil 60 in the winding direction. Therefore, according to this configuration, it is possible to widen the region R on the inner peripheral side of the first coil 60 compared to a case where the IC chip 52 is disposed on the outer peripheral side of the first coil 60 in the winding direction.

In the above-described embodiment, although a form example where the first coil 60 is formed on the front surface 26A of the substrate 26, and the second coil 61 is formed on the back surface 26B of the substrate 26 has been described, the technique of the present disclosure is not limited thereto. The first coil 60 may be formed on the back surface 26B of the substrate 26, and the second coil 61 may be formed on the front surface 26A of the substrate 26. That is, a surface on which the first coil 60 is formed is one surface of the front surface 26A and the back surface 26B, and a surface on which the second coil 61 is formed is the other surface of the front surface 26A and the back surface 26B. Therefore, according to this configuration, it is possible to reduce the thickness of the substrate 26 compared to a case where a new surface different from the front surface 26A and the back surface 26B is provided in the substrate 26 as the surface on which the first coil 60 is formed or the surface on which the second coil 61 is formed.

Figure 11:
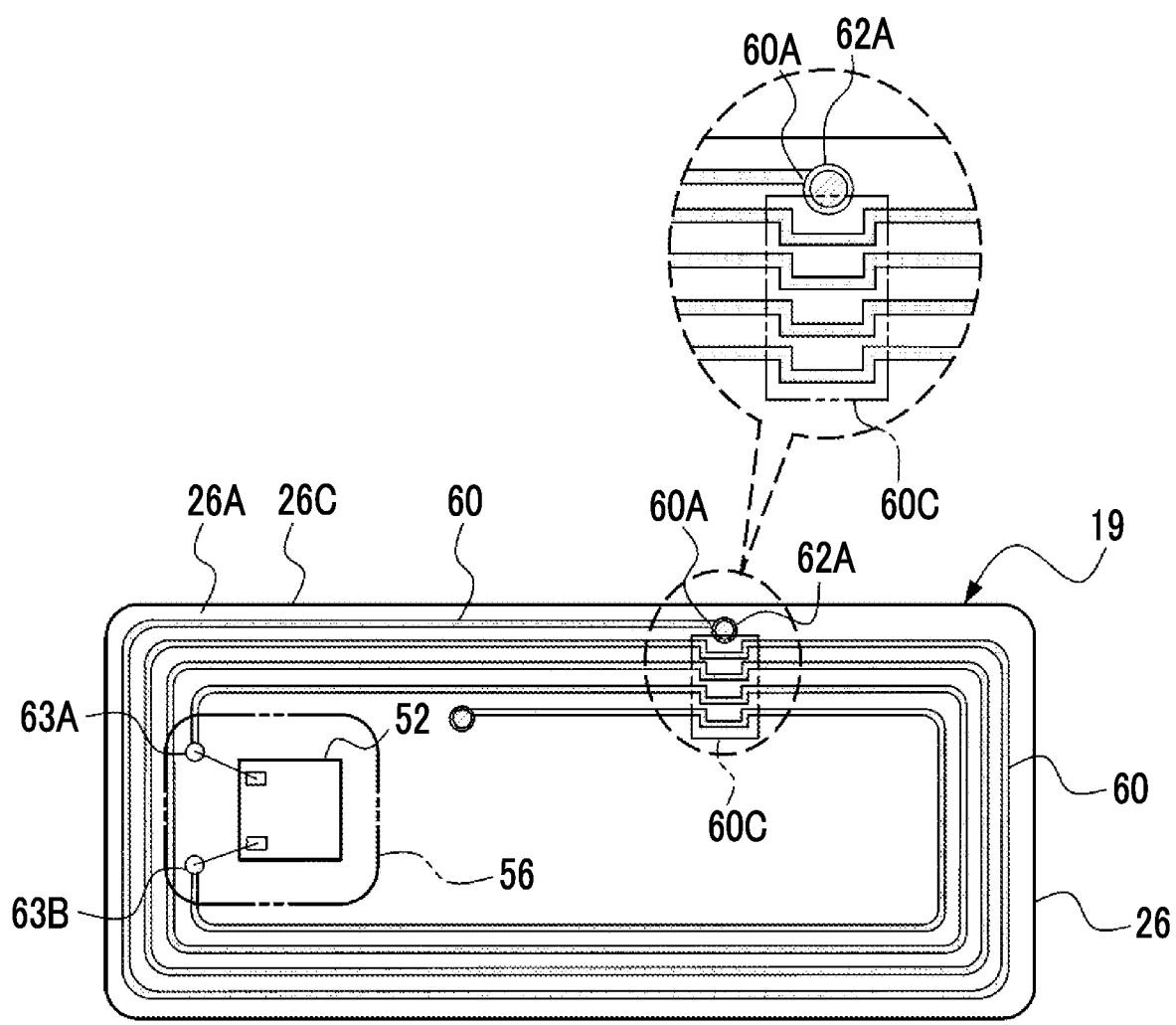
FIG. 11 is a top view showing a modification example of the front surface structure of the cartridge memory.
Figure 12:
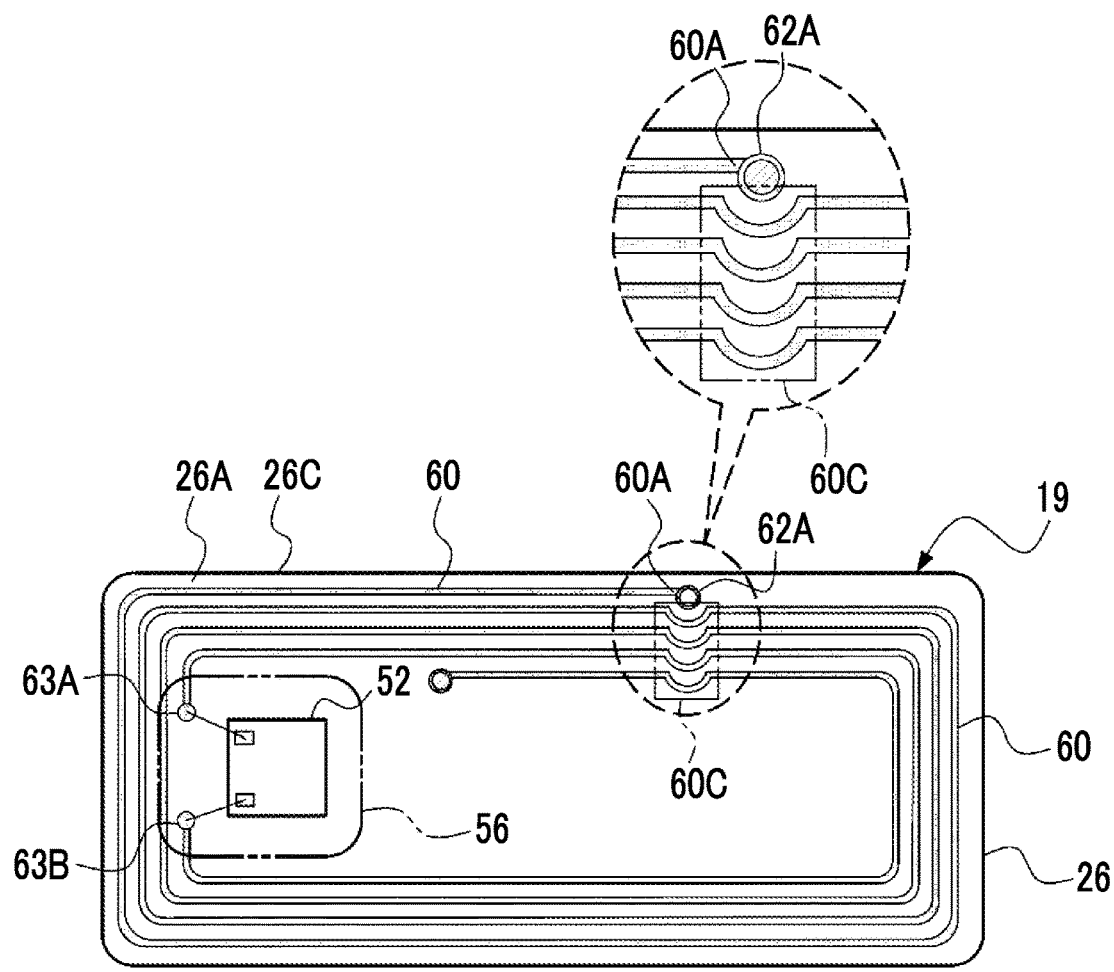
FIG. 12 is a top view showing another modification example of the front surface structure of the cartridge memory.

In the above-described embodiment, although a form example where the bent portion 60C of the first coil 60 has a shape bent in a V shape to the inner peripheral side in the winding direction has been described, the technique of the present disclosure is not limited thereto. As shown in FIG. 11 as an example, the bent portion 60C of the first coil 60 may have a shape bent in a U shape to the inner peripheral side in the winding direction. Therefore, according to this configuration, it is possible to dispose the first coil 60 near the outer periphery 26C of the substrate 26 while maintaining a predetermined distance from the outer peripheral end 60A of the first coil 60. Similarly, the bent portion 61C of the second coil 61 may have a shape bent in a U shape to the inner peripheral side in the winding direction. As shown in FIG. 12 as an example, the bent portion 60C of the first coil 60 may have a shape bent in an arc shape to the inner peripheral side in the winding direction. According to this configuration, it is possible to dispose the first coil 60 near the outer periphery 26C of the substrate 26 while maintaining a given distance from the outer peripheral end 60A of the first coil 60. Similarly, the bent portion 61C of the second coil 61 may have a shape bent in an arc shape to the inner peripheral side in the winding direction.

In the above-described embodiment, although, on the front surface 26A, the portion of the first coil 60 facing the position of the outer peripheral end 60A and the position of the first through-hole 62A is formed in a shape recessed to the inner peripheral side of the first coil 60 in the winding direction, the technique of the present disclosure is not limited thereto. For example, on the front surface 26A, a portion of the first coil 60 facing the position of the first through-hole 62A may be formed in a shape recessed to the inner peripheral side of the first coil 60 in the winding direction.

In the above-described embodiment, although, on the back surface 26B, the portion of the second coil 61 facing the position of the outer peripheral end 61A and the position of the first through-hole 62A is formed in a shape recessed to the inner peripheral side of the second coil 61 in the winding direction, the technique of the present disclosure is not limited thereto. For example, on the back surface 26B, a portion of the second coil 61 facing the position of the first through-hole 62A may be formed in a shape recessed to the inner peripheral side of the second coil 61 in the winding direction.

Figure 13:
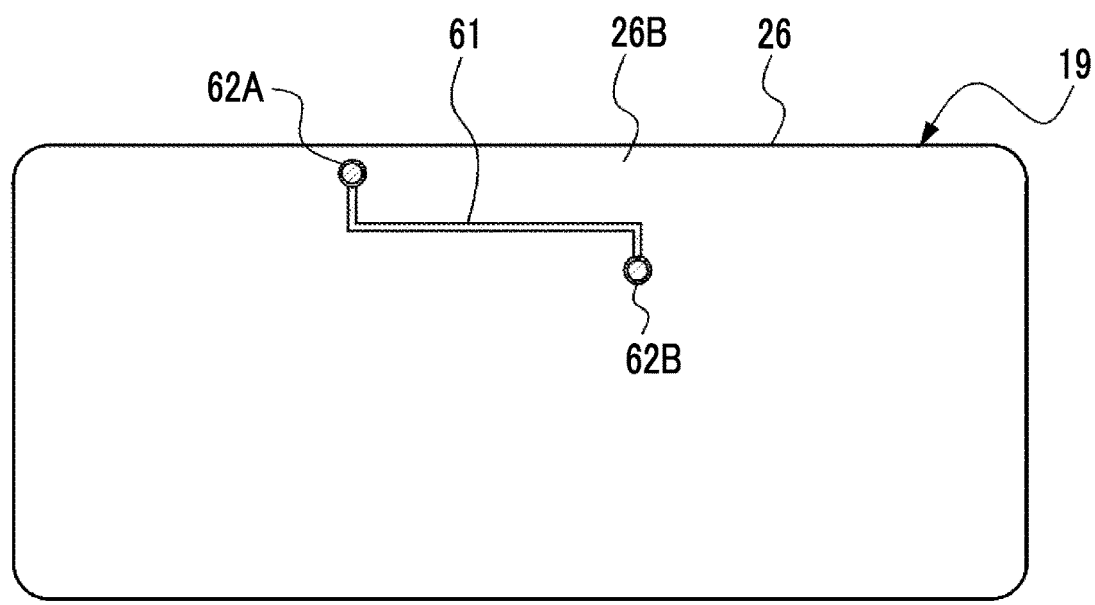
FIG. 13 is a bottom view showing a modification example of the back surface structure of the cartridge memory.

In the above-described embodiment, although a form example where the second coil 61 formed on the back surface 26B of the substrate 26 is wound in a loop shape along the outer periphery 26C of the substrate 26 has been described, the technique of the present disclosure is not limited thereto. As shown in FIG. 13 as an example, the second coil 61 may connect the outer peripheral end 60A and the inner peripheral end 60B through the first through-hole 62A and the second through-hole 62B in a crank shape. In FIG. 13, although a form example where the second coil 61 is formed in a crank shape has been described, the technique of the present disclosure is not limited thereto, and the second coil 61 may be formed in a linear shape.

In the above-described embodiment, although a form example where the IC chip 52 and the first coil 60 are connected by the wiring 65A and 65B (see FIG. 7), the technique of the present disclosure is not limited thereto. For example, the IC chip 52 and the first coil 60 may be connected by a flip-chip connection method.

Figure 14:
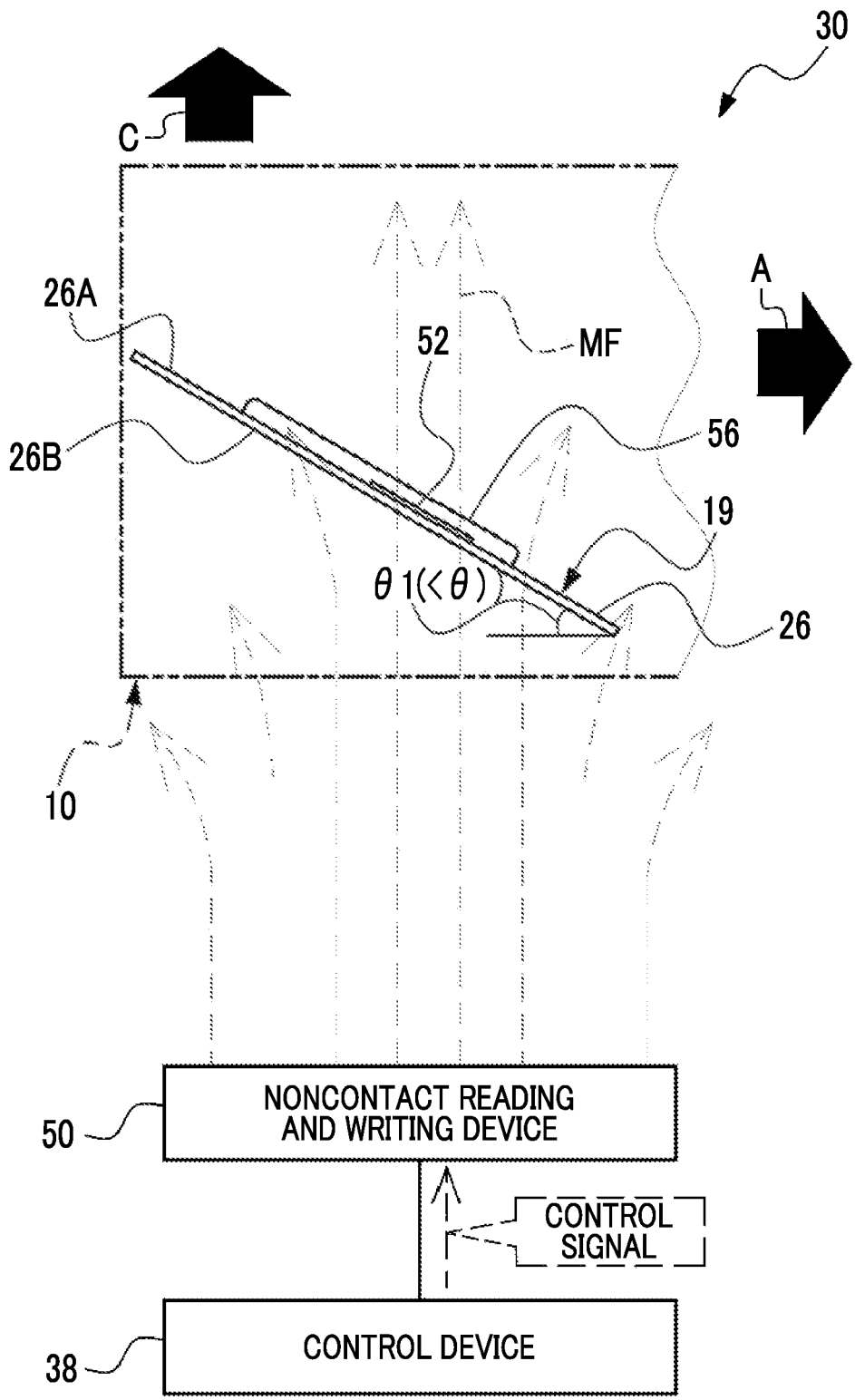
FIG. 14 is a conceptual diagram showing a modification example f an inclination angle of the cartridge memory in the magnetic tape cartridge.

In the above-described embodiment, although 45 degrees have been exemplified as the inclination angle θ, the technique of the present disclosure is not limited thereto. As shown in FIG. 14 as an example, an inclination angle θ1 smaller than the inclination angle θ may be employed as the inclination angle with respect to the reference surface 16A1 of the cartridge memory 19. An example of the inclination angle θ1 is 30 degrees. Since the inclination angle θ1 is an angle smaller than the inclination angle θ, it is possible to make a large number of lines of magnetic force pass through the first coil 60 (see FIG. 7) and the second coil 61 (see FIG. 8) compared to the case of the inclination angle θ. As a result, the first coil 60 and the second coil 61 can obtain a large induced current in a state in which the magnetic tape cartridge 10 is loaded into the magnetic tape drive 30 compared to the case of the inclination angle θ.

The content of the above description and the content of the drawings are detailed description of portions according to the technique of the present disclosure, and are merely examples of the technique of the present disclosure. For example, the above description relating to configuration, function, operation, and advantageous effects is description relating to configuration, function, operation, and advantageous effects of the portions according to the technique of the present disclosure. Thus, it is needless to say that unnecessary portions may be deleted, new elements may be added, or replacement may be made to the content of the above description and the content of the drawings without departing from the gist of the technique of the present disclosure. Furthermore, to avoid confusion and to facilitate understanding of the portions according to the technique of the present disclosure, description relating to common technical knowledge and the like that does not require particular description to enable implementation of the technique of the present disclosure is omitted from the content of the above description and the content of the drawings.

In the specification, "A and/or B" is synonymous with "at least one of A or B". That is, "A and/or B" may refer to A alone, B alone, or a combination of A and B. Furthermore, in the specification, a similar concept to "A and/or B" applies to a case in which three or more matters are expressed by linking the matters with "and/or".

All cited documents, patent applications, and technical standards described in the specification are incorporated by reference in the specification to the same extent as in a case where each individual cited document, patent application, or technical standard is specifically and individually indicated to be incorporated by reference.

What is claimed is:

1. A noncontact communication medium comprising:
    an antenna coil that is formed on a substrate having a through-hole and induces power with application of a magnetic field from an outside; and
    a processing circuit that operates using the power induced by the antenna coil,
    wherein the processing circuit is inserted in the middle of the antenna coil,
    the antenna coil is wound in a loop shape along an outer periphery of the substrate,
    an outer peripheral end of the antenna coil is connected to the through-hole, and
    a portion of the antenna coil on the substrate facing a position of the through-hole has a shape recessed to an inner peripheral side of the antenna coil in a winding direction,
    wherein the portion of the antenna coil facing the position of the through-hole is a plurality of conductive wire portions, and
    the plurality of conductive wire portions have a shape along the longer side of the antenna coil that is recessed to the inner peripheral side in the same shape and with the same degree, and are offset at regular intervals from an outer peripheral side to an innermost peripheral side in the winding direction of the antenna coil.

2. The noncontact communication medium according to claim 1,
    wherein the portion of the antenna coil facing the position of the through-hole has a shape bent in a V shape to the inner peripheral side in the winding direction.

3. The noncontact communication medium according to claim 1,
    wherein the portion of the antenna coil facing the position of the through-hole has a shape bent in a U shape to the inner peripheral side in the winding direction.

4. The noncontact communication medium according to claim 1,
    wherein the portion of the antenna coil facing the position of the through-hole has a shape bent in an arc shape to the inner peripheral side in the winding direction.

5. The noncontact communication medium according to claim 1,
    wherein the substrate has a plurality of surfaces in a thickness direction,
    the antenna coil is formed on a first surface among the plurality of surfaces, and
    one end and the other end of the antenna coil are electrically connected through an auxiliary antenna coil on a second surface different from the first surface among the plurality of surfaces.

6. The noncontact communication medium according to claim 5,
    wherein the first surface is one surface of a front surface and a back surface of the substrate, and
    the second surface is the other surface of the front surface and the back surface.

7. The noncontact communication medium according to claim 5,
    wherein the one end and the other end are electrically connected on the second surface through the through-hole.

8. The noncontact communication medium according to claim 5, wherein the auxiliary antenna coil is formed on the second surface and is wound in a loop shape along the outer periphery of the substrate.

9. The noncontact communication medium according to claim 8,
wherein an outer peripheral end of the auxiliary antenna coil is connected to the through-hole, and
a portion of the auxiliary antenna coil on the second surface facing the position of the through-hole has a shape recessed to an inner peripheral side of the auxiliary antenna coil in a winding direction.

10. The noncontact communication medium according to claim 8
wherein the antenna coil formed on the first surface and the auxiliary antenna coil formed on the second surface are disposed in a zigzag pattern in the thickness direction of the substrate.

11. The noncontact communication medium according to claim 1,
wherein the processing circuit is disposed on the inner peripheral side of the antenna coil in the winding direction.

12. The noncontact communication medium according to claim 1,
wherein the antenna coil has a straight portion and a bent portion, and the straight portion is provided with a shape recessed to the inner peripheral side.

* * * * *